(12) United States Patent
Prosnitz et al.

(10) Patent No.: US 9,372,901 B2
(45) Date of Patent: Jun. 21, 2016

(54) SEARCHING FOR SOFTWARE APPLICATIONS BASED ON APPLICATION ATTRIBUTES

(71) Applicant: Quixey, Inc., Mountain View, CA (US)

(72) Inventors: Jason Prosnitz, Sunnyvale, CA (US); Steve Orrin, Santa Clara, CA (US)

(73) Assignee: Quixey, Inc., Mountain View, CA (US)

( * ) Notice: Subject to any disclaimer, the term of this patent is extended or adjusted under 35 U.S.C. 154(b) by 315 days.

(21) Appl. No.: 13/873,136

(22) Filed: Apr. 29, 2013

(65) Prior Publication Data

US 2013/0290322 A1 Oct. 31, 2013

Related U.S. Application Data

(60) Provisional application No. 61/639,744, filed on Apr. 27, 2012, provisional application No. 61/679,546, filed on Aug. 3, 2012.

(51) Int. Cl.
*G06F 17/30* (2006.01)

(52) U.S. Cl.
CPC ...... *G06F 17/30554* (2013.01); *G06F 17/3053* (2013.01); *G06F 17/30867* (2013.01)

(58) Field of Classification Search
CPC ............... G06F 17/30483; G06F 17/30471; G06F 17/3064; G06F 17/30997; G06F 17/30722; G06F 17/30477; G06F 17/30867; G06F 17/30507; G06F 17/30522; G06F 17/30424; G06F 17/30864; G06F 17/30554; G06F 17/3053; G06F 17/3097
USPC .................................................. 707/705–780
See application file for complete search history.

(56) References Cited

U.S. PATENT DOCUMENTS

| | | | |
|---|---|---|---|
| 8,499,353 B2 * | 7/2013 | Lockhart | G06F 11/3612 726/22 |
| 2005/0234859 A1 * | 10/2005 | Ebata | G06F 21/6218 |
| 2007/0214129 A1 * | 9/2007 | Ture | G06F 17/30864 |
| 2011/0289003 A1 * | 11/2011 | Womack et al. | 705/59 |
| 2011/0307354 A1 * | 12/2011 | Erman et al. | 705/27.1 |
| 2012/0290583 A1 * | 11/2012 | Mahaniok et al. | 707/741 |
| 2012/0316955 A1 * | 12/2012 | Panguluri et al. | 705/14.41 |
| 2013/0227636 A1 * | 8/2013 | Bettini | H04W 4/001 726/1 |
| 2013/0268485 A1 * | 10/2013 | Cao | G06F 8/60 707/609 |
| 2013/0290319 A1 * | 10/2013 | Glover | G06F 17/3053 707/723 |
| 2013/0347094 A1 * | 12/2013 | Bettini | H04L 63/0245 726/11 |

* cited by examiner

*Primary Examiner* — Michelle Owyang
(74) *Attorney, Agent, or Firm* — Honigman Miller Schwartz and Cohn LLP

(57) ABSTRACT

An application search system provides search results for applications based on one or more attributes of the applications. A search query is received by the application search system from a partner. The application search system retrieves a set of applications in response to the search query. In addition, the application search system receives, from one or more sources, restrictive information regarding one or more security attributes for one or more applications in the set of applications. A security value is generated for each of the one or more applications in the set of applications. The security value includes a security attribute value for each of the one or more security attributes. The application search system provides the retrieved set of applications for display at a user interface to the partner. Furthermore, each generated security value is also displayed in conjunction with the corresponding application.

12 Claims, 7 Drawing Sheets

SEARCHING FOR SOFTWARE APPLICATIONS BASED ON APPLICATION ATTRIBUTES

CROSS REFERENCE TO RELATED APPLICATIONS

This application claims the benefit of U.S. Provisional Application 61/639,744, filed Apr. 27, 2012, and U.S. Provisional Application 61/679,546, filed Aug. 3, 2012, which are incorporated by reference in their entirety.

BACKGROUND

1. Field of Art

The disclosure generally relates to the field of application search, and more particularly to the performance of application search using application attributes.

2. Description of the Related Art

In recent years, use of computers, smartphones, and other Internet-connected devices has grown exponentially. Correspondingly, the number of available applications for such devices has also grown. Today, many diverse applications can be accessed on any number of different devices, including but not limited to, smartphones, personal computers, refrigerators, automobiles, and televisions. These diverse applications can range from business driven applications, games, educational applications, news applications, shopping applications, efficiency applications, messaging applications, video chatting applications, media streaming applications, social networking applications, and so much more.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
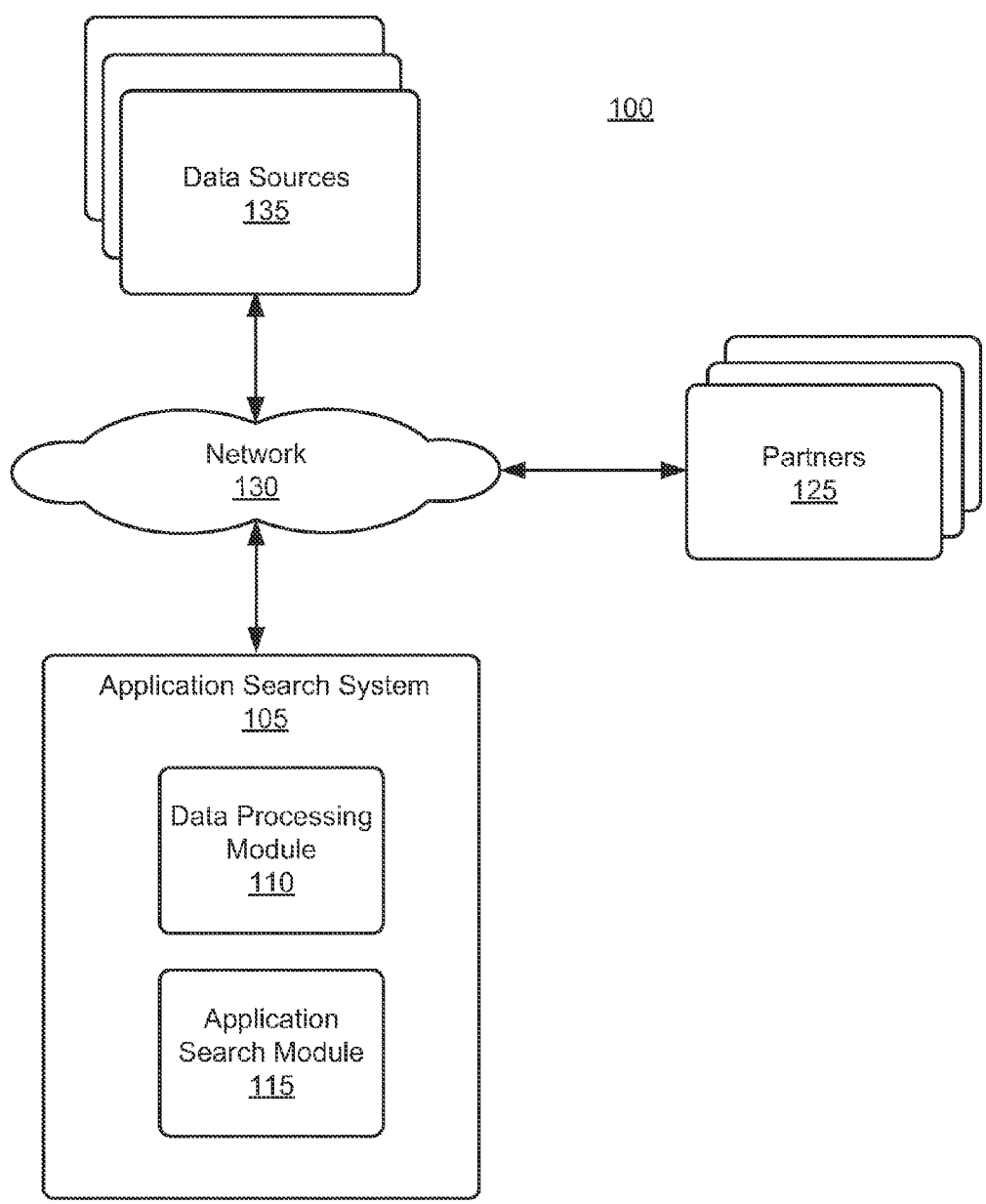
FIG. 1 illustrates a schematic of an example environment for performing application search.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed. It is noted that wherever practicable similar or like reference numbers may be used in the figures and may indicate similar or like functionality.

Configuration Overview

One embodiment of a disclosed system, method, and computer readable storage medium includes providing search results identifying one or more application representations based on application attributes corresponding to the application representations. As used herein, an application can be an object or entity that provides a core set of functionalities. For example, an application may be a software package, such as MICROSOFT OFFICE. As another example, an application may be a website, such as YELP. An application attribute corresponding to an application may provide information regarding one or more aspects of the application, such as functional aspects, developer information, publisher information, title information, different variations or editions of the application, etc. An application representation is a data structure containing one more attributes of an application and used for representing the application.

In one embodiment, an application search system identifies security attributes for one or more applications. A security attribute may correspond to any suitable security related aspect of an application. For example, a security attribute may indicate whether an application contains malware. Another security attribute may indicate whether an application is able to access a user's current location based on global positioning system (GPS) coordinates of the user's computing device. Yet another security attribute may indicate whether an application sends data in an unencrypted form.

In one aspect, the security attributes for the applications are determined based on restrictive information regarding the security attributes received from one or more third-party data sources. For example, restrictive information for a security attribute corresponding to a particular application may be aggregated from several different and/or independent sources. In one embodiment, the restrictive information may be suitably processed and/or combined to generate a value for each of the security attributes.

In one embodiment, based on the security attributes and their associated values, the application search system generates overall security values (also referred to simply as security values) for the one or more applications. In other cases, the security values may have been inherently defined for some applications, and the application search system directly uses these pre-defined security values without generating them. The security values may be used to support searches for application representations performed by the application search system. In one embodiment, for example, the application search system generates one or more search indexes based on the security values for the applications. For example, the application search system may generate an application search index that only includes a set of representations of the applications that meet a threshold security value. Thus, search results generated by leveraging the application search index may only return application representations that meet the threshold security value.

In one embodiment, as another example, the application search system may use the generated security values to rank search results generated by the application search system. For example, responsive to receiving a search query, the application search system identifies a set of application representations determined to be relevant to the search query. Thereafter, the generated security values for the applications corresponding to the set of application representations may be retrieved. The application search system may then rank the application representations in the set based at least in part on the retrieved security values. In one embodiment, the application search system may remove, from the search results, any application representation associated with a security value that does not meet a certain security threshold value.

In one embodiment, as yet another example, the application search system may include security values in the search results provided to a partner (e.g., an end user or a third-party service associated with an end user). For instance, responsive to a search query, the application search system may provide a set of search results. Each result may indicate an application representation determined to be relevant to the search query and a security value corresponding to the application representation. The search result, including the security value, may be provided to a partner for display. In some instances, a partner may further process the search result based on the included security value.

It will be appreciated that while the present disclosure describes application search performed based on security attributes, any other suitable application attribute may be used. For example, the application search system may perform searches using one or more gaminess attributes (attributes indicative of the probability that an application is a game) of one or more applications.

In one embodiment, the application search system may use combinations of different types of attributes from different and separate sources to generate a "community of knowledge." The community of knowledge may be used to generate, for example, security values and/or other values based on other types of attributes. For example, the application search system may receive a malware score for an application from one source. The application search system may receive an indication as whether encrypts data from another source. The application search system may receive an indication as to whether an application accesses the contact information of a user from yet another source. The data from the three sources may constitute a community of knowledge that is usable for generating a security value for the application.

In one embodiment, the application search system may analyze the change in security values and/or security attribute values over time for various applications. For instance, the application search system may determine the rate at which the security value of a particular application has changed over the last month. Based on identified patterns from the analysis, the application search system may generate predictions regarding the security values and/or security attribute values for the applications in the future. For example, based on a rate of decline in the security value of an application over a two month period, the application search system may project, by assuming that a similar rate of decline will continue, the security value of the application one month in the future. Such information can be used to influence application searches (e.g., the application search system may automatically remove a corresponding application representation from search results if it is likely the security value for the application will fall below a threshold value within a predefined time period in the future), sending an indicator to a developer of the application that the security value of the application is falling, etc. In one embodiment, the analysis of the security value of an application may be electronically or otherwise exchanged for other information and/or services. For instance, responsive to providing analysis of a security value of an application, the application search system may receive additional application-related data from the developer or other entity associated with the application.

System Architecture

FIG. 1 is a high-level block diagram illustrating a typical environment 100 used for performing application searches, according to one embodiment. Referring to FIG. 1, the environment 100 includes a network 130, one or more data sources 135, one or more partners 125, and an application search system 105. Each of the one or more data sources 135, one or more partners 125, and application search system 105 may be in communication with one another via the network 130. Only one application search system 105, three data sources 135, and three partners 125 are shown in FIG. 1 for purposes of clarity, but those of skill in the art will recognize that typical environments can have multiple data sources 135 and partners 125, and can also have multiple application search systems 105.

Some embodiments of the application search system 105 have different and/or other modules than the ones described herein. Similarly, the functions can be distributed among the modules in accordance with other embodiments in a different manner than is described here. Likewise, the functions can be performed by other entities.

The network 130 enables communications between the various entities of the environment 100. In one embodiment, the network 130 uses standard communications technologies and/or protocols. Thus, the network 130 can include links using technologies such as Ethernet, Wireless Fidelity (WiFi) (e.g., 802.11), worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

The data sources 135 provide data regarding one or more applications to the application search system 105. The data sources 135 may include any suitable data providers, including operators of application stores, application developers, application catalogs, websites (e.g., blogs, application review sites, user feedbacks, etc.), and/or the like. Alternately, the data sources 135 may include data that is generated by the application search system 105, such as system scan results on particular applications. For example, the application search system 105 may scan an application to determine whether it contains any malware and/or virus. In some cases, the data sources 135 may supply restrictive information regarding one or more security attributes for one or more applications. For example, the restrictive information may include details about whether an application contains malware. The restrictive information may also include details about whether an application can access a user's location. The restrictive information may also include information indicating the amount of time the user has used an application, whether the application downloads contact information of the user, whether the application accesses contacts associated with the user, etc. In one embodiment, each data source 135 may have its own distinct interface, content, update rate, etc.

The partners 125 provide search queries to the application search system 105 and receive search results based on the queries. As used herein, a partner 125 may be a third party entity (e.g., a service, company or other organization) or an end user that leverages the search functionality of the application search system 105. In some instances, a partner 125 may be a third party entity that leverages the search functionality of the application search system 105 via its own website or portal. For example, a partner 125 may display an application search bar on its website. The partner's end users (for ease of understanding also referred to herein as partners) may interact with the search bar to send search queries to the system. In other instances, a partner 125 may be an end user that directly interfaces with a website or portal provided by the application search system 105.

The application search system 105 performs searches for application representations. In one aspect, the application search system 105 matches search queries to application representations based on inferred or derived functional capabilities of the search queries and applications corresponding to the application representations rather than only on explicit matches of the keywords associated with the search queries and applications corresponding to the application representations. In another aspect, the application search system 105 determines one or more characteristics of a search query, which may include, platform requirements (e.g., an application that runs on a mobile phone with an Android operating system), performance requirements (e.g., an application with a good battery life but needs a large bandwidth for uploading/downloading), usability requirements (e.g., an application that is friendly to people with disabilities), and/or the like. The application search system 105 then searches for application representations based on matching between the determined one or more features of the search query and the corresponding features of application representations. In one aspect, the application search system 105 searches for application representations based on the security attributes of applications corresponding to the application representations. As shown in FIG. 1, the application search system 105 includes a data processing module 110 and an application search module 115.

Data Processing Module

Figure 2:
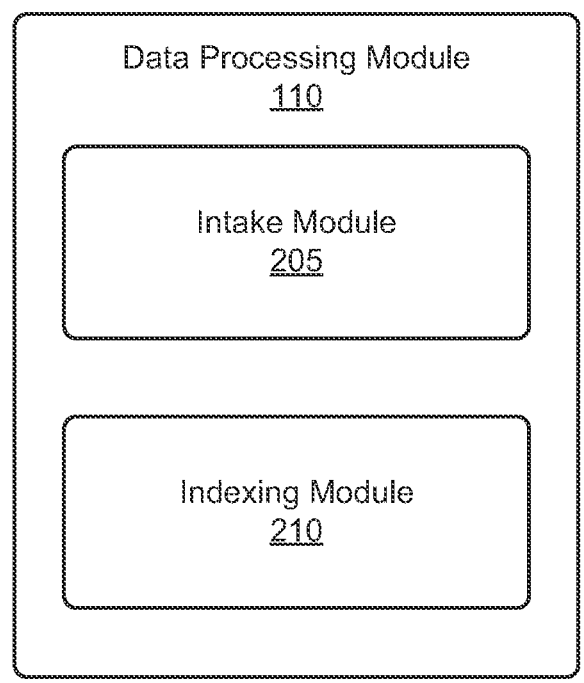
FIG. 2 is a high-level block diagram illustrating a detailed view of example modules within a data processing module.

FIG. 2 is a high level block diagram illustrating a detailed view of modules within the data processing module 110 according to one embodiment. The modules described in accordance with FIG. 2 are executable by one or more computer systems, e.g., computer system 100. Some embodiments of the data processing module 110 have different and/or other modules than the ones described herein. Similarly, the functions can be distributed among the modules in accordance with other embodiments in a different manner than is described here. Likewise, the functions can be performed by other entities. The data processing module 110 includes modules for performing various functions. These modules include an intake module 205 and an indexing module 210.

The intake module 205 receives data from one or more of the data sources 135. The data may be later used to support application search. In one embodiment, the data received from the data sources 135 may include restrictive information regarding security attributes for one or more applications. As used herein, the restrictive information may refer to a set of structured data feeds, wherein each structured data feed is associated with a single security attribute for one application. In one embodiment, some of the data received from the data sources 135 may include information regarding the functionalities of the one or more applications.

The indexing module 210 generates one or more search indexes usable for supporting application search. In order to generate the indexes, the indexing module 210 identifies applications from the data received by the intake module 205. The indexing module 210 additionally extracts attributes for the identified applications. In some cases, the extracted attributes may relate to functional aspects of the identified applications. In other cases, the extracted attributes may relate to characteristics of the identified applications, including but not limited to, sizes of the applications in bytes, names of the applications, descriptions of the applications, developer information of the applications, rating information of the applications, etc. In yet other cases, the extracted attributes may relate to security attributes of the identified applications.

In one embodiment, the identified applications can be represented in application representation structures (application representations). More specifically, each identified application can be represented as a collection of its extracted attributes. Following generation of the representations, the indexing module 210 generates one or more search indexes. Each search index may be a data structure populated with various application representations. The search indexes may later be used to perform application searches. In one embodiment, the indexing module 210 may generate a search index using one or more security attributes for the applications extracted from the restrictive information received from the data sources 135.

In some cases, when a new application representation is added to a search index based on one of its attributes, a partner may query other attributes about the new application representation. For example, a new application representation is added to a search index based on its developer reputation attribute. The application search system 105 may further acquire other attributes of the new application representation (e.g., from third-party sources), such as security attributes, size information, etc., and provide these other attributes to the partner responsive to an application programming interface (API) call made by the partner to the application search system 105.

Application Search Module

Figure 3:
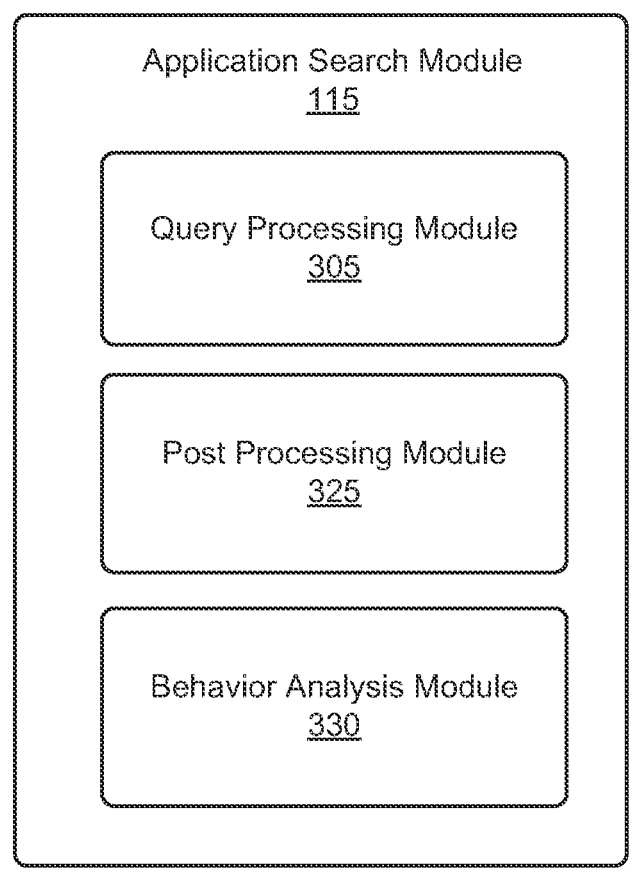
FIG. 3 is a high-level block diagram illustrating a detailed view of modules within an application search module.

FIG. 3 is a high level block diagram illustrating a detailed view of modules within the application search module 115 according to one embodiment. Some embodiments of the application search module 115 have different and/or other modules than the ones described herein. Similarly, the functions can be distributed among the modules in accordance with other embodiments in a different manner than is described here. Likewise, the functions can be performed by other entities. The application search module 115 includes modules for performing various functions. These modules include a query processing module 305, a post processing module 325, and a behavioral analysis module 330.

The query processing module 305 processes queries received from one or more partners. In one embodiment, the query processing module 305 receives an input Q from a partner. The input Q may include a search query and additional context information for the query, such as platform constraint information, geo-location preferences, partner specific information, etc. Based on the input Q, the query processing module 305 generates a set of queries. In addition to constructing the set of queries, the query processing module 305 additionally generates a set of query features $F_q$ based on the received search query. A query feature may be any suitable information related to a search query. For example, a query feature may include information indicating a number of words in a search query. Other query features might include predicted concepts of the search query, etc. Query features can also include information specifying the popularity or frequency of the received search query.

In one embodiment, the input Q including the search query may indicate whether security attributes are to be used to influence the search results. For example, the partner may specifically indicate in the input Q that security attributes be considered. In some cases, the partner may select, at search time, whether he wants to consider security attributes. Alternatively, the partner may select whether and/or what security attributes should be considered at a time prior to an input Q being received. For example, prior to any search, a partner can specify that all searches associated with the partner's end users should have search results influenced by application security attributes. In some cases, the application search system may identify a partner using information included in the input Q, such as the partner's IP address, language, a unique identifier for the partner, etc. Based on such information, the application search system can automatically determine whether a search performed responsive to the input Q should be influenced by one or more security attributes. For example, based on a unique code for the partner, the application search system may determine that the partner previously indicated that all associated searches be influenced by one or more security attributes. Thus, the application search system performs searches for application representations, where the search is influenced by one or more security attributes.

After processing the query, the query processing module 305 identifies an initial set of application representations. Following identification of the initial set of application representations, the query processing module 305 determines application-specific features $F_r$ for the applications corresponding to the initial set of application representations. In one embodiment, the application-specific features $F_r$ associated with each application representation in the initial set may be related to a corresponding application's various characteristics. The features may also include other data for applications represented by the application representations, such as the number of times the applications were clicked or downloaded for the provided input Q, the current overall popularity of the applications, popularity of the applications with respect to a given partner, etc. The features may additionally include spam-scores, security or privacy data about the applications, etc. The features may further include information about the reputation of the developer and/or publisher of the applications.

In one embodiment, the query processing module 305 processes the initial set of application representations in order to generate a set of ranked search results. To do so, the query processing module 305 generates a set of query/result features $F_{q/r}$ that indicate the relationships between the set of features $F_r$ associated with the application representations in the initial set and the query features $F_q$. For example, the set of features $F_{q/r}$ may indicate the distances between terms in the search query and terms in the titles of the applications represented by the application representations.

In some embodiments, the query processing module 305 applies at least the application-specific features $F_r$, the query/result feature $F_{q/r}$, and the query features $F_q$ to a machine learned scoring model. The machine learned scoring model may score the relevance of each application representation to the search query based on the application-specific features $F_r$, the query/result feature $F_{q/r}$, and the query features $F_q$. Based on the scoring, the query processing module 305 generates a set of search results. The set of search results may include an ordering of application representations from the initial set of application representations based on the scores for the application representations. The ordering may indicate the determined relevance of the application representations to the search query. In one approach, the ordering of application representations may be influenced by any generated security values.

In one embodiment, the post-processing module 325 processes any search results to generate a final results list. More specifically, the post-processing module 325 may obtain display-related metadata for the results. As used herein, display-related metadata may include any information about an application to be presented to an end user partner. Displayed-related metadata may include application images (e.g., application screenshots), application descriptions, application videos, etc. In one embodiment, the post-processing module 325 may restrict the number of results in the list that are from a single application developer or platform. In one embodiment, the search results may include the security values and/or individual security attribute values for the applications.

The behavior analysis module 330 monitors the actions of the partner that provided the query. For example, the system can determine which application representations were eventually viewed or downloaded by the partner, etc. Such information can be analyzed to further improve the performance of subsequent searches performed by the application search module 115.

Process for Performing Searches Using Application Attributes

Figure 4:
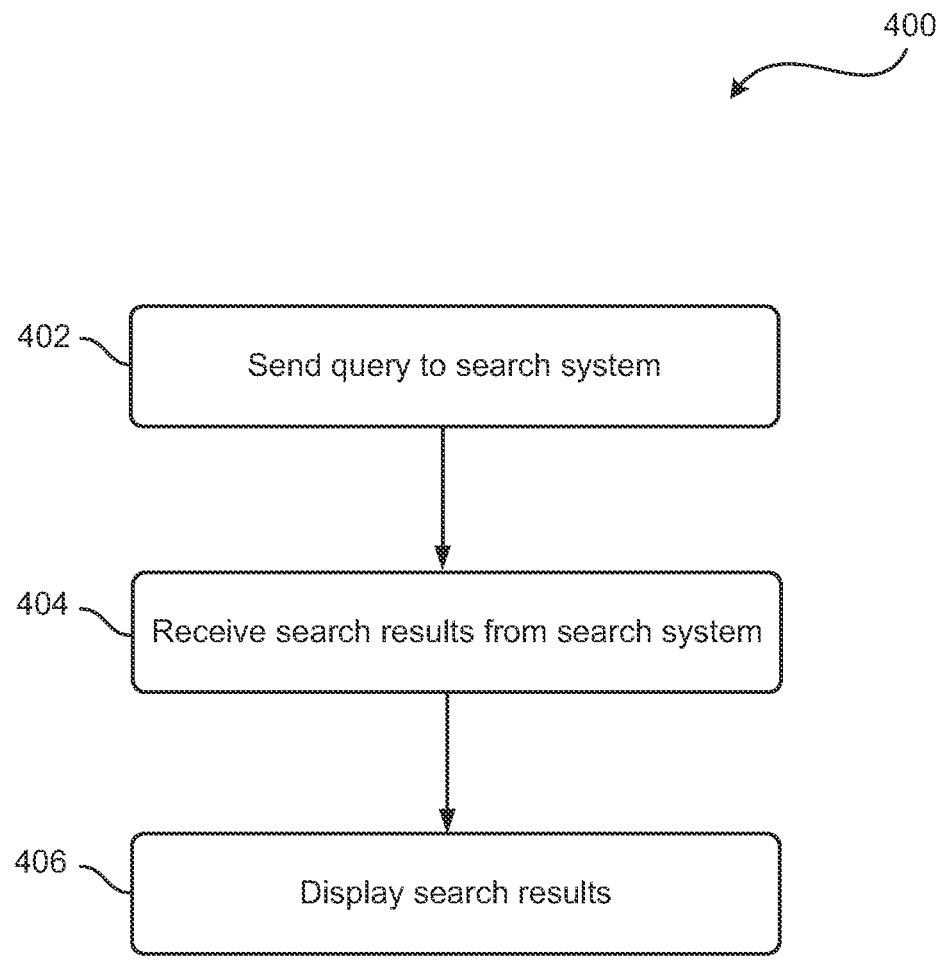
FIG. 4 is a flow chart illustrating an example method for a partner to interact with an application search system.

FIG. 4 illustrates a method for a partner 125 to interact with an application search system 105, in accordance with an embodiment. Other embodiments can perform the steps of the method in different orders and can include different, additional, and/or fewer steps. The process 400 shown in FIG. 4 can be performed by an end user partner's device, for example, a desktop computer, a laptop computer, a smartphone, etc. In the process 400, the end user partner's device sends 402 a search query to an application search system 105. The search query may have been input by the end user partner by interacting with the end user partner's device. The search query may be sent directly to the application search system 105 or indirectly through a second partner (e.g., via a website of a third-party organization). In some cases, the search query may include or be associated with an indication that the search be performed based on the security attributes of the applications. The search query is processed by the application search system 105 to generate search results (discussed more fully below in the context of FIG. 5). In some cases, the search results may be selected and/or ranked according to one or more security attributes. The end user partner's device then receives 404 the search results from the application search system 105. The end user partner's device displays 406 the search results to the end user partner. In one approach, the search results displayed may include the applications' security values based on the applications' security attribute values.

Figure 5:
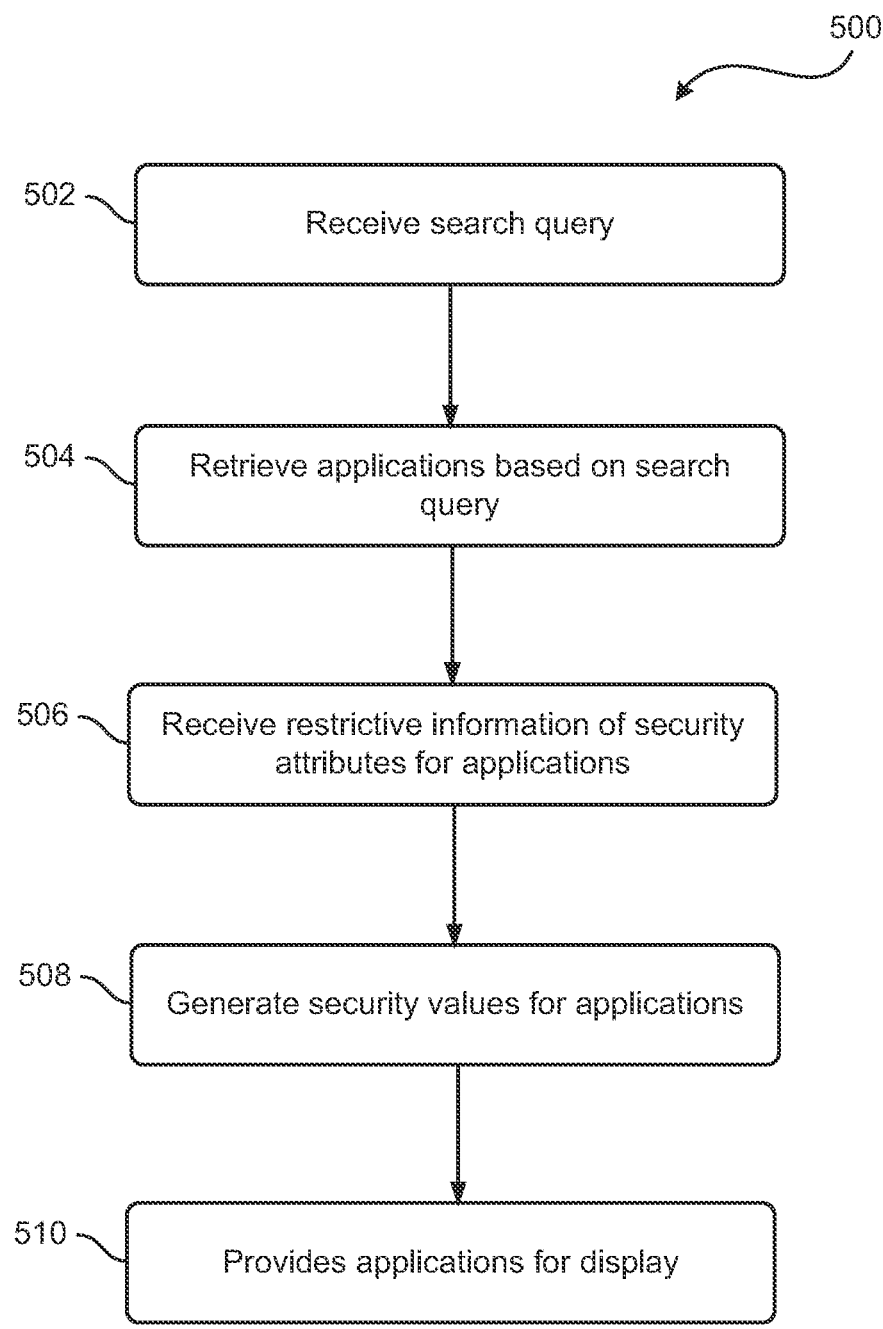
FIG. 5 is a flow chart illustrating an example method for an application search system to process a search query.

FIG. 5 illustrates a method for processing a search query, in accordance with an embodiment. Other embodiments can perform the steps of the method in different orders and can include different, additional, and/or fewer steps. The process 500 shown in FIG. 5 can be performed by the application search system 105. A search query is received 502 by the application search system 105. In one embodiment, the search query may be extracted from an input Q from a partner. The search query may be further processed by the query processing module 305 to generate a set of query features $F_q$. As discussed, a query feature may be any suitable information related to a search query. For example, a query feature may include predicted concepts or desired categories of the search query. In some cases, based on the search query, the application search system 105 may determine whether to perform searches that are influenced by security attributes of the applications. Such a determination may be made based on some terms in the search query or a separate indication associated with the search query. Alternately, such a determination may be made based on where the search query comes from. For example, the determination may be made by identifying an IP address or unique identifier associated with the partner. Based on the IP address or unique identifier, the application search system 105 may determine that the partner or some other entity previously indicated that any searches of the partner be influenced by application security attributes.

A set of application representations is retrieved 504 in response to the search query. In one embodiment, the set of application representations are identified and retrieved based on the search query. For example, the query processing module 305 may automatically select one or more search indexes for retrieving the set of application representations. The query processing module 305 then queries the selected search indexes using the search query to identify the set of application representations. Alternatively, the set of application representations may be retrieved by using a modified Lucene learning algorithm. In some embodiments, the query processing module 305 may further determine application-specific features $F_r$ for the set of application representations, and a set of query/result features $F_{q/r}$ that indicate the relationships between the query features $F_q$ and the application-specific features $F_r$. The features $F_r$, $F_{q/r}$, and $F_q$ corresponding to the application representation may then be used by a machine learned scoring model to score the relevance of each application representation to the search query. Based on the scores, the set of application representations may be ranked.

In one embodiment, the application search system 105 receives 506, from one or more data sources 135, restrictive information regarding one or more security attributes for one or more application corresponding to the set of application representations. A security attribute for an application may refer to any security-related aspect of the application. Illustratively, a security attribute of an application may refer to whether the application contains malware. Malware, short for malicious software, is a general term used to refer to a variety of forms of hostile or intrusive software. Another security attribute of the application may refer to whether the application can access a user's location. Yet another security attribute of the application may refer to whether the application sends data in an unencrypted form.

In one embodiment, the restrictive information regarding the one or more security attributes may be received from one or more third-party sources in any suitable manner. For example, the application search system 105 may directly obtain restrictive information from a third-party source via a data feed from the third-party source. As another example, a user of an application A may post his experience with application A and his comments on application A on his blog. The user may even give application A his own rating. The application search system 105 may acquire relevant information about application A from the user's blog.

The restrictive information may be any suitable information. For instance, the restrictive information may be a detailed report. The detailed report may indicate, for example, that an application A "does not access the user's location, contains 1 malware, and sends data without encryption." Alternatively, the restrictive information may be a single score indicating the security level of an application as determined by a particular third-party source. For example a third-party source may test websites for malware and spam, and provide a single score for each tested website. In other cases, the restrictive information may include a combination of scores and detailed reports. For example, a third-party data source may provide information with three distinct parts: rating categories, content descriptors, and interactive elements. An entertainment software may be associated with a score (e.g., a category label) in each of the above distinct parts. In addition, the entertainment software may also have "rating summaries" that provide detailed descriptions of the content of the software being rated.

In some cases, the restrictive information is gathered based on static analysis, e.g., normal application scanning for malware, virus, etc. In other cases, the restrictive information is gathered based on dynamic analysis, e.g., running the application in an emulator to track the application's software development kit calls or other suspicious activities, etc. In some embodiments, such static and dynamic analysis of applications may be performed by the application search system 105 and/or a suitable third-party entity. In some cases, the static and/or dynamic analysis may be performed in real-time (e.g., immediately after identification of an application for a search query). In other cases, the static and/or dynamic analysis may be performed offline (e.g., before receiving any search query). Results of the offline analysis may be saved into a system database (e.g., one of the data sources 135 in FIG. 1) for later retrieval.

After retrieving the restrictive information, the application search system 105 generates 508 a security value for each application corresponding to the one or more application representations in the set of application representations. In one embodiment, the security value includes a security attribute value for each of the one or more security attributes. For instance, an application's security value may be expressed as a weighted sum of the application's security attribute values: $S=\Sigma_{i=1}^{L} c_i A_i$, where S is the security value, $A_i$ is the $i^{th}$ security attribute value, and $c_i$ is the $i^{th}$ weight. For example, one security attribute may indicate whether "an application can track a user's location", and another security attribute may indicate whether "an application contains malware". Other security attributes may indicate whether "an application can access the user's address book," whether "an application can perform in-application purchases," whether "an application can access a user's credit card information" whether "an application can uniquely identify a user," whether "an application can send/receive data without encryption," whether "an application downloads a user's contact list," whether "an application is linked to a user's FACEBOOK contacts," and/or the like. The above list of security attributes is by no means exhaustive.

In one embodiment, the weights $c_i$ are determined in response to the preferences of the partner and/or a query wrapper associated with the search query. The query wrapper may contain additional information in addition to the actual query, including but not limited to, IP address, language, partner ID number, etc. The query wrapper may be used to uniquely identify a particular partner. The preferences of a partner may be obtained from the partner's past interactions with the application search system 105. The preferences of a partner may be directly provided by the partner, determined through an analysis performed by the behavior analysis module 330 of past behavior of the partner, etc.

For example, it may be determined that a partner A is more concerned with whether an application can track the user's location based on a determination that partner A has, in the past, avoided downloading application having such an attribute. In contrast, it may be determined that a partner B is more concerned with whether an application contains malware based on a determination that the partner B has specifically indicated that applications containing malware not appear in search results. The weights $c_i$ may then be adjusted according to each partner's preferences. For instance, the security attribute indicating whether "an application can track the user's location" may be given more weight for partner A, while the security attribute indicating whether "an application contains malware" may be given more weight for partner B.

In another embodiment, the weights $c_i$ are not adjusted, and the partners may have individual filters tailored to their own preferences. For example, partner A's filter may emphasize the security attribute indicating whether "an application can track the user's location", while partner B's filter may emphasize the security attribute indicating whether "an application contains malware". Each partner's filter is applied to the one or more application representations to "filter" application representations suited to the partner's individual preferences. In some cases, a partner's filter is provided via an API call made by the partner. For instance, a partner may provide a filter including an overall threshold security value. Alternately, a partner's filter may include threshold values for certain security attributes. Illustratively, the partner's filter may specify a high threshold value for the security attribute indicating whether "an application contains malware". As a result, the partner is only shown application representations with security attribute values higher than the threshold. In another approach, the partner is only shown application representations with security attribute values lower than the threshold.

In one embodiment, a security attribute value $A_i$ is determined based on the restrictive information regarding the corresponding security attribute. In addition, the restrictive information may be obtained from one or more sources, and each source may evaluate the security attribute differently (e.g., each source may give a different source score). Illustratively, the security attribute value $A_i$ may be expressed as a weighted sum of all the source scores: $A_i = \Sigma_{j=1}^{M} b_{ij} x_{ij}$, where $x_{ij}$ is the $j^{th}$ source score for the $i^{th}$ security attribute, and $b_{ij}$ is the corresponding weight. As an example, for the security attribute indicating whether "an application can track a user's location," different sources (such as APPTHORITY, ESRB, MCAFEE, etc.) may rate an application differently. Some may give the application a high score for the security attribute, while others may give the application a low score for the security attribute. Additionally, each source may use a different rating scheme. For example, one source may use a five-star rating system, while another source may use a ten-star rating system. A source score may need to be properly normalized before it can be input to the sum $A_i = \Sigma_{j=1}^{M} b_{ij} x_{ij}$. Essentially, the security attribute value is an "average" source score by taking a weighted sum of all source scores. In one approach, the weight for each source score is determined based on the reputation and/or creditability of that source. For example, a high weight may be assigned to a score coming from a credible, professional rating source (e.g., ESRB). In contrast, a low weight may be assigned to a score given by an amateur user's feedback.

In one embodiment, a source score $x_{ij}$ may be determined using one or more methods, and each method may give a method score. Illustratively, the source score $x_{ij}$ may be expressed as a weighted sum of all method scores: $x_{ij} = \Sigma_{k=1}^{N} d_{ijk} m_{ijk}$, where $m_{ijk}$ is the $k^{th}$ method score for the $j^{th}$ source on the $i^{th}$ security attribute, and $d_{ijk}$ is the corresponding weight. As an example, for the security attribute indicating whether "an application can track a user's location", a third-party source, may evaluate an application using multiple methods. There are a variety of ways that an application can track a user's location. For example, the application may access a global positioning system (GPS) to track a user's location. The application may also infer a user's location from the user's IP address. In the above example, the third-party source may enumerate the multiple methods that the application can use to track a user's location, and give each method a method score $m_{ijk}$ with a corresponding weight $d_{ijk}$ to produce a source score $x_{ij}$. In some cases, the weights $d_{ijk}$ may be determined from a machine learned model. In other cases, some of the weights $d_{ijk}$ may be zero, indicating that the corresponding methods are deemed unimportant.

In one embodiment, the security attribute value $A_i$ may be further processed and assigned a binary value. The binary value may be determined by comparing $A_i$ to a pre-determined threshold value. For example, if $A_i$ is larger than or equal to the threshold value, the binary value is 1, indicating that the application is secure in that security attribute. If $A_i$ is less than the threshold value, the binary value is 0, indicating that the application is not secure in that security attribute. In some cases, the threshold value may be determined based on the preferences of the partner providing the search query. For instance, a partner A may have previously indicated or it may be inferred by the application search system 105 based on past behavior that the partner A prefers an application that cannot track a user's location. Thus, a threshold value for the security attribute indicating whether "an application can track a user's location" may be relatively high for the partner A. In contrast, a partner B may have previously indicated or it may be inferred by the application search system 105 based on past behavior that the partner B only wants an application that does not contain malware. The partner B may not care whether the application can track a user's location. Thus, the partner B's threshold value for the security attribute indicating whether "the application can track a user's location" may be relatively low. As a result, a particular application may meet partner B's threshold value, but not partner A's threshold value, reflecting the partner's different preferences.

In some embodiments, the security attribute value $A_i$ may include a binary value together with a description. For example, the binary value may be 0, and the corresponding description may state "the application has 5 malware packages". The description may provide more information about the security attribute than a single binary value.

After generation of security values for applications corresponding to one or more application representations in the set of application representations, the application search system provides 510 the set of application representations for display to the partner. In one embodiment, the security value S of an application is also displayed in conjunction with the corresponding application representation. In one approach, the security value may be displayed as a security indicator. For example, a red indicator may correspond to a non-secure application ("not good to use"), a green indicator may correspond to a secure application ("good to use"), and a yellow indicator may correspond to an application with medium-level security concerns ("use with caution").

In some cases, there may be some application representations without security values in the set of application representations. Those application representations may also be provided for display, and they may be ranked based on the determined relevance of each application representation to the search query. In one example, the application representations without security values are not provided for display.

In another approach, the application representations with security values are ranked based on the determined relevance of each application representation to the search query in conjunction with the corresponding application representation's security value. For example, an application representation with a determined high relevance together with a high security value is ranked higher than an application representation with a determined high relevance but with a low security value. As a specific example of ranking, one or more feature vectors for one or more application representations in the set may be generated. Each feature vector may include a set of features for a corresponding application representation, where each feature is generated from one or more application attributes included in the application representation. In one aspect, the security value corresponding to each application representation may be used as a feature in a feature vector corresponding to the application representation. After generating the feature vectors for the application representations, the feature vectors may be input into a machine-learned scoring model to generate scores for the application representations. The scores may be used to rank the application representations.

In yet another approach, the application representations' security values are compared to a threshold value, and those application representations that have lower-than-threshold security values are not provided for display. For example, if the threshold value is determined to be 0.5, then any application representation with a security value less than 0.5 will not be provided for display. Each displayed application representation will have a security value higher than or equal to 0.5. The threshold value may be selected by a partner, either prior to any search or at search time. Alternatively, the threshold value may be determined by the application search system 105 based on the partner's past interactions with the application search system 105. For instance, if a partner has consistently avoided downloading applications with low security values, the application search system may automatically determine to increase the threshold value for the particular partner. The threshold value for a partner may also be dynamically adjusted based on the partner's feedback. For example, an initial threshold value may be pre-selected for a partner, and the threshold value can be dynamically increased or decreased based on the partner's request.

Figure 6:
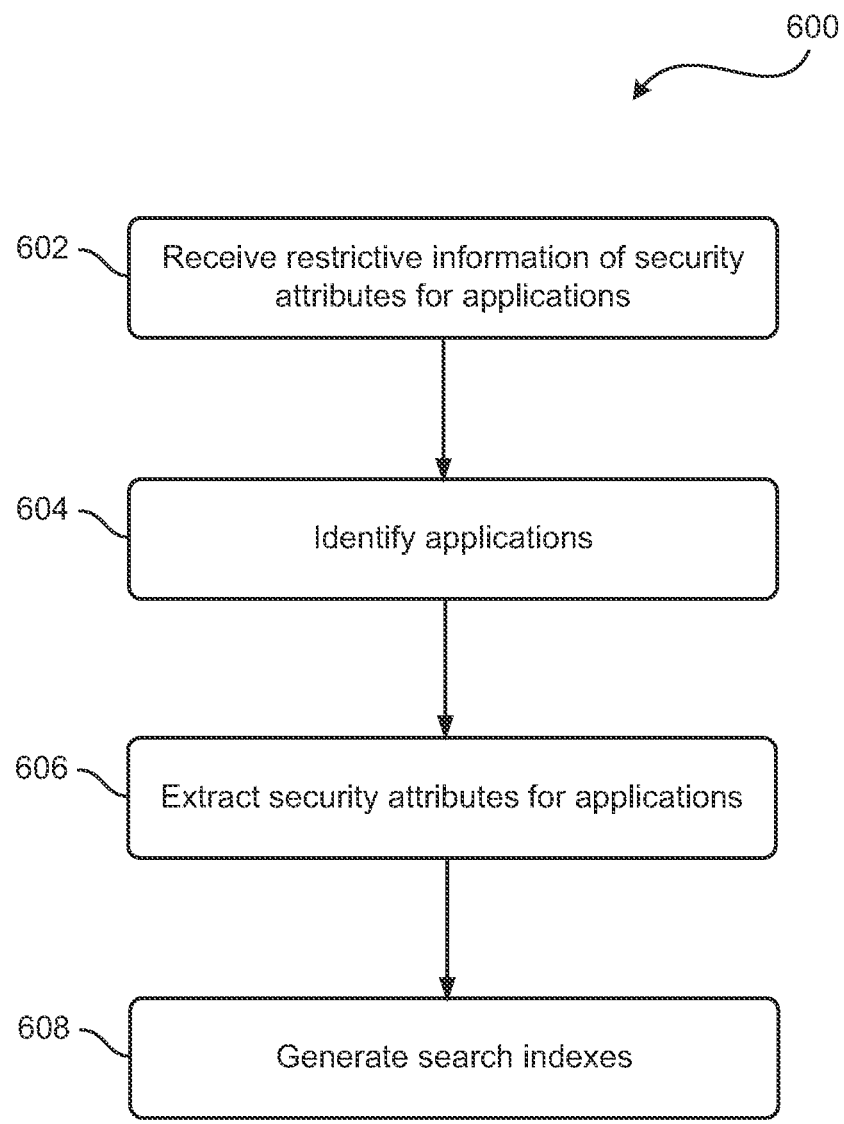
FIG. 6 is a flow chart illustrating an example method for an application search system to generate search indexes, and process a search query.

FIG. 6 illustrates a method for generating search indexes and for processing a search query, in accordance with an embodiment. Other embodiments can perform the steps of the method in different orders and can include different, additional, and/or fewer steps. The process 600 shown in FIG. 6 can be performed by the by the application search system 105. More specifically, the process 600 may be performed by the data processing module 110. The entire process 600 may be performed "offline", e.g., when the application search system 105 is not processing search queries.

In one embodiment, the intake module 205 receives 602 information, including restrictive information, regarding a plurality of applications from one or more data sources 135. The indexing module 210 identifies 604 one or more applications from the information. In some approaches, not all of the plurality of applications is identified. For example, some applications within the plurality of applications may have too little information for indexing purposes, so these applications are unidentified by the indexing module 210.

The indexing module 210 further extracts 606 one or more security attributes for the identified applications. Such security attributes may indicate whether "an application can track a user's location", whether "an application has malware", whether "an application sends/receives data without encryption", and so on. In some approaches, the identified applications can be represented in application representation structures, and each identified application may be represented, in part, as a collection of its extracted security attributes.

Following generation of the representations, the indexing module 210 generates 608 one or more search indexes based on the extracted security attributes for the identified applications. Each search index may be data structures populated with the representations of the applications. Different kinds of search indexes may be generated. For instance, a forward search index may be generated that stores a list of security attributes for each application. An inverted search index may also be generated that stores a list of applications for each security attribute.

In one embodiment, a security attribute value may be determined for each extracted security attribute of each application corresponding to each application representation based on the received restrictive information. The security attribute values may be included in the generated search indexes. For example, a list of application representations for a security attribute in an inverted search index may be ranked according to each application representation's associated security attribute value for that security attribute. Determination of the security attribute value associated with an application representation based on restrictive information can be performed in a manner similar to the determination of security attribute values described with respect to the process shown in FIG. 5.

In one embodiment, the security attribute values for a particular security attribute of the one or more application representations may be compared to a threshold value. In some cases, threshold values for different security attributes may be different. A set of application representations is identified, wherein each application representation in the set of application representations has at least one security attribute value less than the security attribute's corresponding threshold. The set of application representations is then removed from the one or more application representations. The search indexes are generated from the remaining application representations in the one or more application representations. Each application representation in the remaining application representations has above-threshold security attribute values for all extracted security attributes. Thus, the search results identified using the search indexes may only include application representations that have above-threshold security attribute values.

After security-based search indexes are generated as illustrated above, they can be used to enhance a partner's search results. In one embodiment, a search query from a partner is received by the application search system 105. As discussed, a determination may be made by the application search system 105 that the partner is interested in searching for applications with high security standards. The search is then performed using the security-based search indexes instead of normal search indexes that are not generated based on security attributes. The resulting list of application representations is more likely to be of use to the partner.

The embodiments described herein beneficially allow application search systems to provide higher quality search results. More specifically, by analyzing security attributes of applications, embodiments can generate search results that are more relevant for various partner contexts. In doing so, partners can more quickly and efficiently locate useful applications that meet their needs.

Computing Machine Architecture

Figure 7:
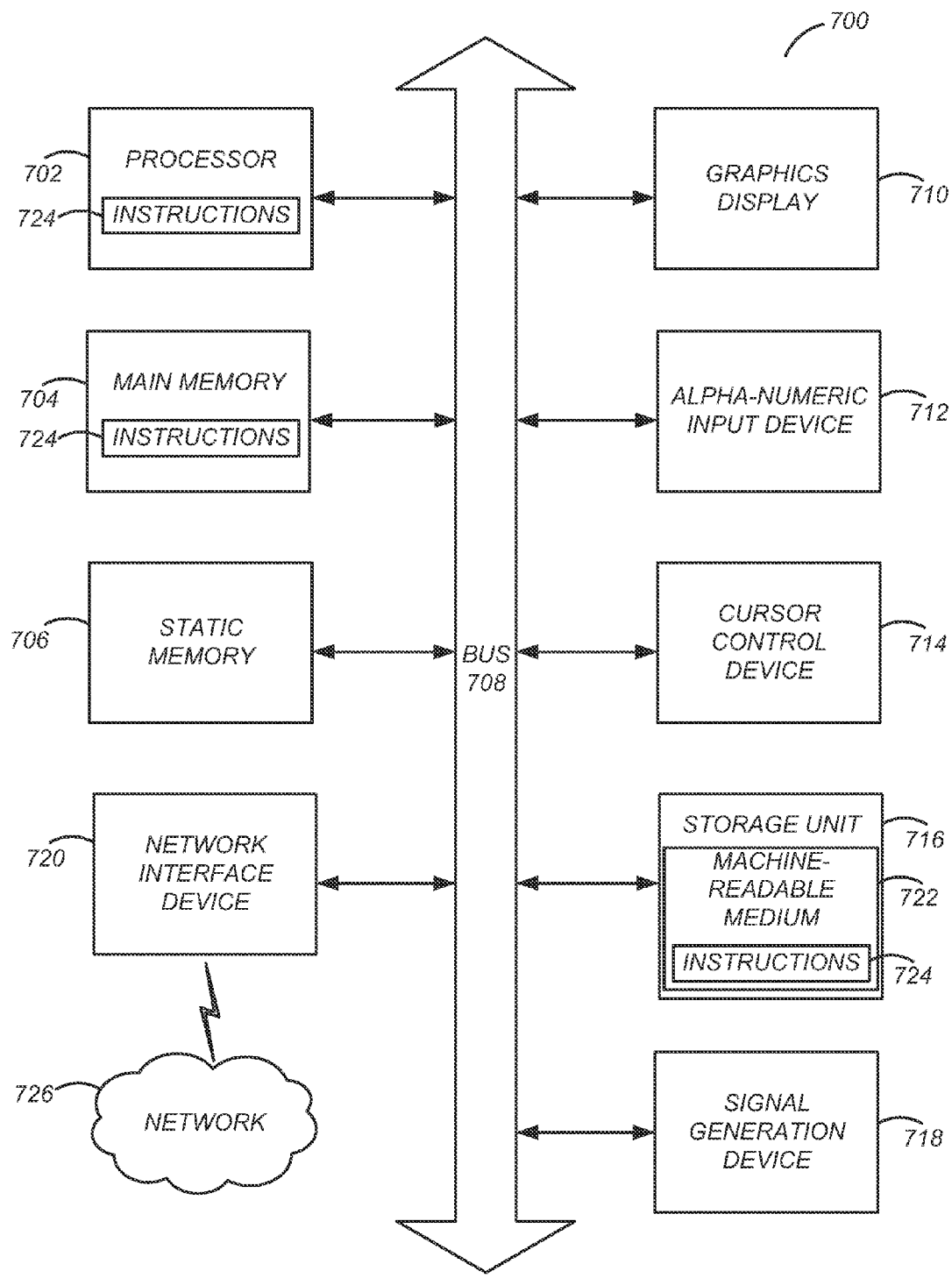
FIG. 7 illustrates components of an example machine able to read instructions from a machine-readable medium and execute the instructions in a processor (or controller).

FIG. 7 is a block diagram illustrating components of an example machine able to read instructions from a machine-readable medium and execute them in a processor (or controller), as an example of the search system 105, partners 125, or client devices. Specifically, FIG. 7 shows a diagrammatic representation of a machine in the example form of a computer system 700 within which instructions 724 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processors 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include graphics display unit 710 (e.g., a plasma display panel (PDP), a liquid crystal display (LCD), a projector, or a cathode ray tube (CRT)). The computer system 700 may also include an alphanumeric input device 712 (e.g., a keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but is not limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 through 7. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors, e.g., processor 802) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA), an application-specific integrated circuit (ASIC), system on a chip (SoC), chipset) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 802, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating search results based on application attributes through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for performing application searches, the method comprising an application search system performing the steps of:

receiving a search query from a remote device associated with a partner;

retrieving an initial set of application representations based on the search query, each application representation corresponding to a respective application of a plurality of applications and including a security value that is based on a plurality of security attribute values that correspond to a plurality of respective security attributes, the security value being indicative of an overall security risk associated with installing or using the respective application, the plurality of security attribute values being based on restrictive data collected from one or more data sources;

determining a result set of application representations from the initial set of application representations based at least in part on the security values of the application representations in the initial set of application representations;

generating search results based on the result set of application representations, the search results comprising a set of individual results, each individual result respectively corresponding to an application representation in the result set of application representations and including display indicia corresponding to the security value of the application representation; and providing the search results for display at a user interface of the remote device.

2. The method of claim 1, wherein determining the result set of application representations includes:

ranking the one or more application representations in the initial set of application representations, each application representation ranked based on the determined relevance of the application representation to the search query in conjunction with the security value corresponding to the application representation; and determining the result set of application representation based on the ranked application representations in the initial set of application representations.

3. The method of claim 1, wherein determining the result set of application representations includes:

identifying a subset of application representations from the initial set of application representations, each application representation in the subset of application representations having a security value less than a threshold value; and removing, from the initial set of application representations, the subset of application representations.

4. The method of claim 1, wherein the one or more data sources comprise one or more third-party sources.

5. The method of claim 1, wherein the restrictive information of an application comprises results of a security scan of the application.

6. The method of claim 1, wherein the restrictive information of an application comprises user feedback regarding the application.

7. The method of claim 1, wherein the security value for each application representation comprises a weighted sum of the plurality of security attribute values for the corresponding application representation.

8. The method of claim 7, wherein the weights in the weighted sum are determined based on the preferences of the partner.

9. The method of claim 1, wherein the security attribute value comprises a weighted sum of source scores, each source score determined from a source of the one or more sources based on the restrictive information regarding the security attribute.

10. The method of claim 9, wherein the source score comprises a weighted sum of one or more method scores, each method score calculated by a method chosen by the source.

11. A non-transitory computer-readable storage medium storing computer program instructions executable to perform steps comprising:

receiving a search query from a remote device associated with a partner;

retrieving an initial set of application representations based on the search query, each application representation corresponding to a respective application of a plurality of applications and including a security value that is based on a plurality of security attribute values that correspond to a plurality of respective security attributes, the security value being indicative of an overall security risk associated with installing or using the respective application, the plurality of security attribute values being based on restrictive data collected from one or more data sources;

determining a result set of application representations from the initial set of application representations based at least in part on the security values of the application representations in the initial set of application representations;

generating search results based on the result set of application representations, the search results comprising a set of individual results, each individual result respectively corresponding to an application representation in the result set of application representations and including display indicia corresponding to the security value of the application representation; and providing the search results for display at a user interface of the user device.

12. An applications search engine comprising:

a memory device storing a plurality of application representations, each application representation corresponding to a respective application and including features of the application including a security value of the application that is based on a plurality of security attribute values that correspond to a plurality of respective security attributes, the security value being indicative of an overall security risk associated with installing or using the respective application, the plurality of security attribute values being based on restrictive data collected from one or more data sources;

at least one processor; and a non-transitory computer-readable storage medium storing computer program instructions that when executed cause the at least one processor to:

receive a search query from a remote device associated with the partner;

retrieve an initial set of application representations from the memory device based on the search query;

determine a result set of application representations from the initial set of application representations based at least in part on the security values of the application representations in the initial set of application representations;

generate search results based on the result set of application representations, the search results comprising a set of individual results, each individual result respectively corresponding to an application representation in the result set of application representations and including display indicia corresponding to the security value of the application representation; and provide the search results for display at a user interface of the user device.

\* \* \* \* \*